(12) United States Patent
Mori

(10) Patent No.: US 9,428,177 B2
(45) Date of Patent: Aug. 30, 2016

(54) VEHICLE

(71) Applicant: TOYOTA JIDOSHA KABUSHIKI KAISHA, Toyota-shi, Aichi (JP)

(72) Inventor: Yuki Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/761,681

(22) PCT Filed: Sep. 11, 2013

(86) PCT No.: PCT/JP2013/005386
§ 371 (c)(1),
(2) Date: Jul. 17, 2015

(87) PCT Pub. No.: WO2014/155434
PCT Pub. Date: Oct. 2, 2014

(65) Prior Publication Data
US 2016/0001766 A1     Jan. 7, 2016

(30) Foreign Application Priority Data

Mar. 25, 2013  (JP) ................................ 2013-062832

(51) Int. Cl.
| | |
|---|---|
| *B60L 9/00* | (2006.01) |
| *H02J 7/06* | (2006.01) |
| *B60W 20/00* | (2016.01) |
| *B60L 11/14* | (2006.01) |
| *B60L 11/18* | (2006.01) |
| *H01M 10/44* | (2006.01) |

(Continued)

(52) U.S. Cl.
CPC ............... *B60W 20/106* (2013.01); *B60L 7/16* (2013.01); *B60L 11/14* (2013.01); *B60L 11/18* (2013.01); *B60L 11/1809* (2013.01); *B60L 11/1861* (2013.01); *B60L 11/1862* (2013.01); *B60L 15/2045* (2013.01); *B60W 20/13* (2016.01); *H01M 10/44* (2013.01); *H02J 7/0047* (2013.01); *B60W 2710/244* (2013.01);

(Continued)

(58) Field of Classification Search
USPC ............................................ 701/22; 320/159
See application file for complete search history.

(56) References Cited

U.S. PATENT DOCUMENTS

| | | | | |
|---|---|---|---|---|
| 5,204,611 A | * | 4/1993 | Nor ....................... | H02J 7/0086 320/145 |
| 5,396,163 A | * | 3/1995 | Nor ....................... | H02J 7/0086 320/159 |

(Continued)

FOREIGN PATENT DOCUMENTS

| | | |
|---|---|---|
| JP | 2003-235108 A | 8/2003 |
| JP | 2011-015520 A | 1/2011 |

(Continued)

*Primary Examiner* — Thomas G Black
*Assistant Examiner* — Tyler Paige
(74) *Attorney, Agent, or Firm* — Oliff PLC

(57) ABSTRACT

A vehicle includes an electric storage apparatus that outputs an electric power to be converted into a kinetic energy for use in running of the vehicle, an engine that generates a kinetic energy for use in running of the vehicle, a generator that receives an output from the engine to generate an electric power, and a controller that controls charge and discharge of the electric storage apparatus. In performing charge of the electric storage apparatus using an electric power from an external power source and in performing charge of the electric storage apparatus using the electric power output from the generator in response to a signal produced through operation by a user, the controller calculate a full charge capacity of the electric storage apparatus based on an SOC of the electric storage apparatus at each of start and end of the charge and a current sum amount during the charge.

9 Claims, 6 Drawing Sheets

(51) Int. Cl.
  *B60L 7/16* (2006.01)
  *B60L 15/20* (2006.01)
  *H02J 7/00* (2006.01)
  *H01M 10/42* (2006.01)

(52) U.S. Cl.
  CPC ............... *H01M 2010/4271* (2013.01); *H02J 2007/0049* (2013.01); *Y02T 10/645* (2013.01); *Y02T 10/705* (2013.01); *Y02T 10/7005* (2013.01); *Y02T 10/7044* (2013.01); *Y02T 10/7072* (2013.01); *Y02T 10/72* (2013.01); *Y02T 10/7283* (2013.01); *Y02T 90/14* (2013.01); *Y10S 903/903* (2013.01)

(56) References Cited

U.S. PATENT DOCUMENTS

| | | | | |
|---|---|---|---|---|
| 5,929,609 | A * | 7/1999 | Joy | ............... H02J 7/1446 322/23 |
| 6,326,765 | B1 * | 12/2001 | Hughes | ............... B60L 11/1801 320/104 |
| 9,236,745 | B2 * | 1/2016 | Izumi | ............... B60K 6/445 |
| 2012/0306450 | A1 | 12/2012 | Nakayama et al. | |
| 2013/0175974 | A1 * | 7/2013 | Bassham | ............. B60L 11/1837 320/106 |
| 2013/0231811 | A1 * | 9/2013 | Aoki | ............ B60L 11/18 701/22 |
| 2013/0289815 | A1 | 10/2013 | Suzuki | |
| 2014/0184236 | A1 | 7/2014 | Ohkawa et al. | |
| 2014/0236379 | A1 * | 8/2014 | Masuda | ............... H01M 10/44 700/297 |
| 2015/0177331 | A1 | 6/2015 | Nakayama et al. | |

FOREIGN PATENT DOCUMENTS

| | | |
|---|---|---|
| JP | 2012-029455 A | 2/2012 |
| JP | 2012-147554 A | 8/2012 |
| JP | 2012-189373 A | 10/2012 |
| JP | 2012-247339 A | 12/2012 |
| WO | 2011/001266 A2 | 1/2011 |
| WO | 2012/010955 A2 | 1/2012 |
| WO | 2012/169061 A1 | 12/2012 |

* cited by examiner

VEHICLE

TECHNICAL FIELD

The present invention relates to a vehicle in which the SOC of an electric storage apparatus can be increased by using the output from an engine.

BACKGROUND ART

Patent Document 1 has described a technique in which the full charge capacity of a battery is calculated in performing charge of the battery with an external power source. Specifically, the SOC of the battery is calculated at the start and the end of the charge, and current values detected during the charge are summed to calculate a value (sum value). Then, the difference between the SOCs at the start and the end of the charge and the sum value are used to calculate the full charge capacity of the battery.

PRIOR ART DOCUMENT

Patent Document

[Patent Document 1] Japanese Patent Laid-Open No. 2012-029455

DISCLOSURE OF THE INVENTION

Problems to be Solved by the Invention

In Patent Document 1, the full charge capacity of the battery is calculated only when the external charge of the battery is performed. If the external charge is not performed, the full charge capacity of the battery cannot be calculated, and possible opportunities of calculating the full charge capacity are reduced. Since the full charge capacity of the battery is reduced with deterioration of the battery, the latest full charge capacity needs to be kept track of. If possible opportunities of calculating the full charge capacity are reduced, the latest full charge capacity is difficult to keep track of.

Means for Solving the Problems

A vehicle according to an aspect of the present invention includes an electric storage apparatus, an engine, a generator, and a controller. The electric storage apparatus outputs an electric power to be converted into a kinetic energy for use in running of the vehicle. The engine generates a kinetic energy for use in running of the vehicle. The generator receives an output from the engine to generate an electric power. In performing charge of the electric storage apparatus using an electric power from an external power source (referred to as external charge) and in performing charge of the electric storage apparatus using the electric power output from the generator in response to a signal produced through operation by a user (referred to as forced charge), the controller calculates a full charge capacity of the electric storage apparatus based on a State of Charge (SOC) of the electric storage apparatus at each of start and end of the charge and a current sum amount during the forced charge.

In the present invention, the full charge capacity of the electric storage apparatus is calculated not only in performing the external charge but also in performing the forced charge. In contrast to Patent Document 1 in which the full charge capacity is calculated only in performing the external charge, the calculation of the full charge capacity can also be made in performing the forced charge. This can increase the opportunities of calculating the full charge capacity to provide more possibilities for obtaining the full charge capacity in which the deterioration of the electric storage apparatus is taken into account.

An SOC calculated after elimination of polarization of the electric storage apparatus resulting from the forced charge can be used as the SOC at the end of the forced charge. When the forced charge is performed, the polarization may occur due to the charge to reduce the accuracy in calculating the SOC (estimation accuracy). The calculation of the SOC after the elimination of the polarization due to the forced charge can remove any error in the SOC calculation arising from the polarization to increase the accuracy in calculating the SOC.

The polarization due to the forced charge can be eliminated by discharging the electric storage apparatus. Specifically, the polarization can be cancelled by producing a state (discharge state) opposite to the state (charge state) in which the polarization occurs. The discharge of the electric storage apparatus after the end of the forced charge can eliminate the polarization due to the forced charge, allowing the calculation of the SOC of the electric storage apparatus in the state in which the polarization is eliminated.

The polarization due to the forced charge depends on the current sum amount during the forced charge. For discharging the electric storage apparatus to eliminate the polarization due to the forced charge, a discharge amount for the electric storage apparatus can be specified from the current sum amount during the forced charge. Once the correspondence between the current sum amount during the forced charge and the discharge amount for eliminating the polarization is determined, the current sum amount during the forced charge is measured, and then the discharge amount for eliminating the polarization can be specified.

After the discharge amount for eliminating the polarization is specified, the electric storage apparatus can be discharged by the discharge amount to eliminate the polarization due to the forced charge. As a result, the SOC of the electric storage apparatus can be calculated in the state in which the polarization is eliminated.

The polarization due to the forced charge can also be eliminated by leaving the electric storage apparatus standing without charge and discharge. Specifically, when the electric storage apparatus is left standing after the end of the forced charge, the polarization due to the forced charge is gradually reduced, and in this case, the polarization due to the forced charge can be eliminated without performing the discharge of the electric storage apparatus by the discharge amount specified from the current sum amount during the forced charge.

The discharge amount for eliminating the polarization can be reduced in accordance with the time (standing time) for which the electric storage apparatus is left standing. As the standing time is longer, the polarization due to the forced charge is more likely to be eliminated. This means that, as the standing time is longer, the rate at which the discharge amount is reduced can be increased.

When the electric storage apparatus is discharged after the forced charge, the full charge capacity of the electric storage apparatus can be calculated by factoring in not only the SOCs at the start and the end of the forced charge and the current sum amount during the forced charge but also the discharge amount. When the SOC after the discharge of the electric storage apparatus is used as the SOC at the end of the forced charge, the discharge of the electric storage apparatus is included in the time period of change from the SOC at the start to the SOC at the end of the forced charge. Thus, the discharge amount of the electric storage apparatus also needs to be factored in the calculation of the full charge capacity of the electric storage apparatus.

In a mode in which the engine and the electric storage apparatus are used in combination to run the vehicle, the charge and discharge of the electric storage apparatus are controlled such that the SOC of the electric storage apparatus is changed within a predetermined range. The electric storage apparatus can be charged to an SOC higher than the upper limit value of the predetermined range in performing the forced charge. This allows running of the vehicle only with the output from the electric storage apparatus after the forced charge until the SOC of the electric storage apparatus is reduced to the upper limit value of the predetermined range.

The vehicle according to the present invention can be provided with a motor generator in addition to the generator described above. The motor generator can receive the electric power output from the electric storage apparatus to generate a kinetic energy for use in running of the vehicle and can convert a kinetic energy generated in braking of the vehicle into an electric power.

The vehicle according to the present invention can be provided with a switch that outputs a signal for requesting the forced charge. The switch is operated by a user and outputs a signal for requesting the forced charge to the controller through the operation by the user. In performing the forced charge, the electric storage apparatus can be charged at a constant current. The charge at the constant current facilitates the accurate calculation of the current sum amount during the forced charge as compared with the case where the charge current is variable. This enables the accurate calculation of the full charge capacity of the electric storage apparatus.

BRIEF DESCRIPTION OF THE DRAWINGS

FIG. 4 is performed.

MODE FOR CARRYING OUT THE INVENTION

Embodiment of the present invention will hereinafter be described.

Embodiment 1

Figure 1:
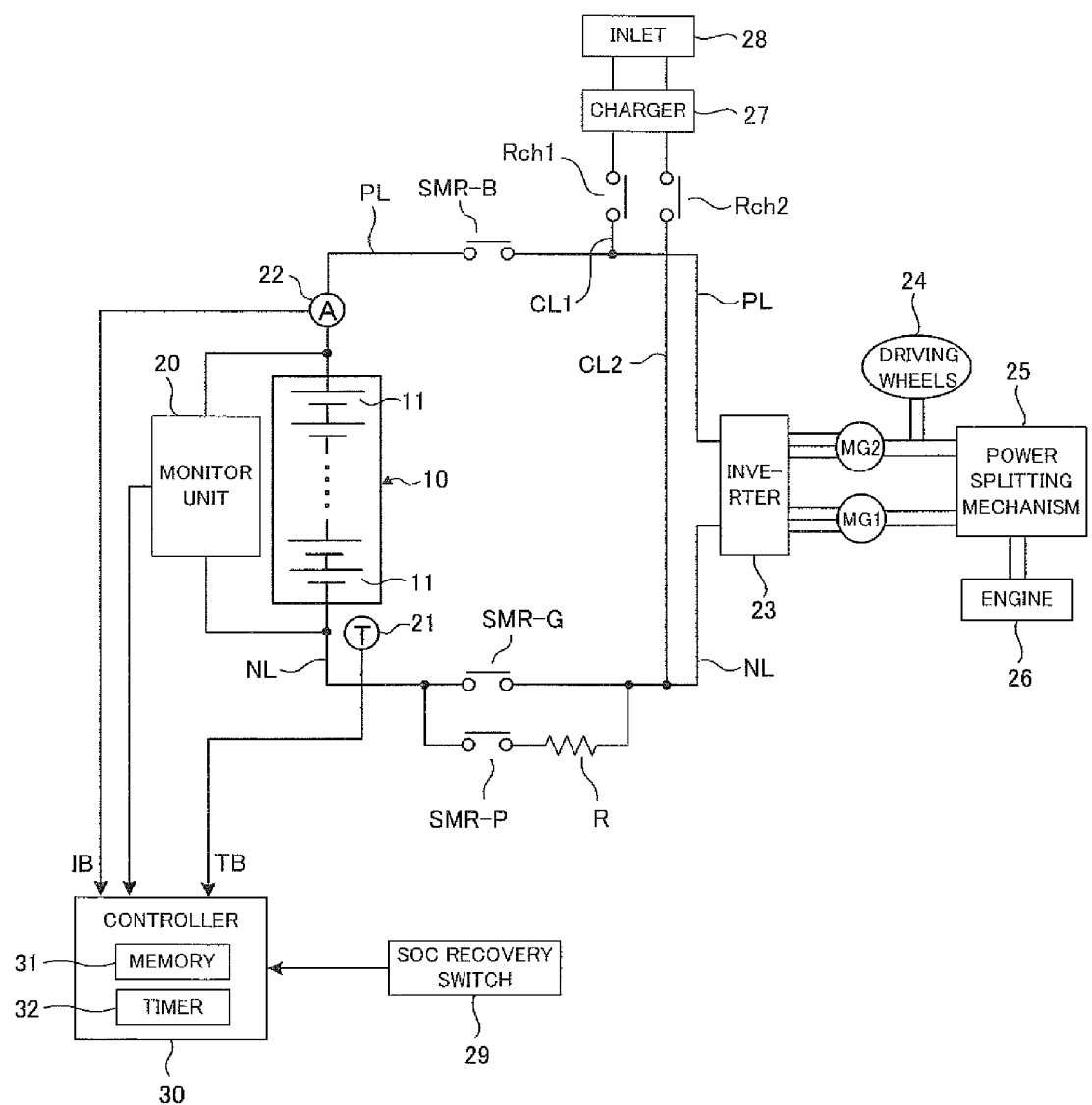
FIG. 1 is a diagram showing the configuration of a battery system.

FIG. 1 is a diagram showing the configuration of a battery system according to Embodiment 1. The battery system is mounted on a vehicle.

An assembled battery (corresponding to an electric storage apparatus of the present invention) 10 includes a plurality of cells 11 connected in series. A secondary battery such as a nickel metal hydride battery and a lithium-ion battery can be used as the cell 11. Instead of the secondary battery, an electric double layer capacitor can be used. The number of the cells 11 can be set as appropriate based on the output required of the assembled battery 10 or the like. The assembled battery 10 may include a plurality of cells 11 connected in parallel.

A monitor unit 20 detects a voltage between terminals of the assembled battery 10 or detects a voltage between terminals of each cell 11, and outputs the detection result to a controller 30. A temperature sensor 21 detects a temperature TB of the assembled battery 10 and outputs the detection result to the controller 30.

A current sensor 22 is provided on a positive electrode line PL connected to a positive electrode terminal of the assembled battery 10. The current sensor 22 detects a current (charge current or discharge current) IB flowing through the assembled battery 10 and outputs the detection result to the controller 30. In the present embodiment, it is assumed that a positive value is used as the current value IB detected by the current sensor 22 during discharge of the assembled battery 10. It is also assumed that a negative value is used as the current value IB detected by the current sensor 22 during charge of the assembled battery 10.

Although the current sensor 22 is provided on the positive electrode line PL in the present embodiment, the current sensor 22 is only required to detect the current flowing through the assembled battery 10, and the position to provide the current sensor 22 can be set as appropriate. Specifically, the current sensor 22 can be provided on at least one of the positive electrode line PL and a negative electrode line NL. The negative electrode line NL is connected to a negative electrode terminal of the assembled battery 10. A plurality of current sensors 22 may be provided.

The controller 30 includes a memory 31. The memory 31 stores various types of information for allowing the controller 30 to perform predetermined processing (specifically, processing described in the present embodiment). The controller 30 also includes a timer 32. The timer 32 is used for measuring time. Although the memory 31 and the timer 32 are contained in the controller 30 in the present embodiment, at least one of the memory 31 and the timer 32 may be provided outside the controller 30.

The positive electrode line PL is provided with a system main relay SMR-B. The system main relay SMR-B is switched between ON and OFF in response to a control signal from the controller 30. The negative electrode line NL is provided with a system main relay SMR-G. The system main relay SMR-G is switched between ON and OFF in response to a control signal from the controller 30.

The system main SMR-G is connected in parallel to a system main relay SMR-P and a current limiting resistor R. The system main relay SMR-P and the current limiting resistor R are connected in series. The system main relay SMR-P is switched between ON and OFF in response to a control signal from the controller 30. The current limiting resistor R is used to prevent a flow of inrush current when the assembled battery 10 is connected to a load (specifically, an inverter 23 described later).

The assembled battery 10 is connected to the inverter 23 through the positive electrode line PL and the negative electrode line NL. For connecting the assembled battery 10 to the inverter 23, the controller 30 first switches the system main relay SMR-B from OFF to ON and the system main relay SMR-P from OFF to ON. This causes an electric current to pass through the current limiting resistor R.

Next, the controller 30 switches the system main relay SMR-G from OFF to ON and switches the system main relay SMR-P from ON to OFF. This completes the connection between the assembled battery 10 and the inverter 23, and the battery system shown in FIG. 1 enters Ready-On state. The controller 30 receives information about ON/OFF of an ignition switch of the vehicle. The controller 30 starts up the battery system shown in FIG. 1 in response to switching of the ignition switch from OFF to ON.

On the other hand, when the ignition switch is switched from ON to OFF, the controller 30 switches the system main relays SMR-B and SMR-G from ON to OFF. This breaks the connection between the assembled battery 10 and the inverter 23, and the battery system shown in FIG. 1 enters Ready-Off state.

The inverter 23 converts a DC power output from the assembled battery 10 into an AC power and outputs the AC power to a motor generator MG2. The motor generator MG2 receives the AC power output from the inverter 23 to generate a kinetic energy for running of the vehicle. The motor generator MG2 is connected to driving wheels 24 through a reduction gear and the like. The kinetic energy generated by the motor generator MG2 is transferred to the driving wheels 24 to allow the running of the vehicle.

A power splitting mechanism 25 transfers a motive power of an engine 26 to the driving wheels 24 or to a motor generator MG1. The motor generator MG1 receives the motive power of the engine 26 to generate an electric power. The electric power generated by the motor generator MG1 is supplied to the motor generator MG2 through the inverter 23 or is supplied to the assembled battery 10. When the electric power generated by the motor generator MG1 is supplied to the motor generator MG2, the motor generator MG2 generates a kinetic energy which can drive the driving wheels 24. When the electric power generated by the motor generator MG1 is supplied to the assembled battery 10, the assembled battery 10 can be charged.

For decelerating or stopping the vehicle, the motor generator MG2 converts a kinetic energy generated in braking of the vehicle into an electric energy (AC power). The inverter 23 converts the AC power generated by the motor generator MG2 into a DC power and outputs the DC power to the assembled battery 10. Thus, the assembled battery 10 can accumulate the regenerative electric power.

Although the assembled battery 10 is connected to the inverter 23 in the present embodiment, the present invention is not limited thereto. Specifically, a step-up circuit can be provided on the current path connecting the assembled battery 10 with the inverter 23. The step-up circuit can increase the voltage output from the assembled battery 10 and output the electric power at the increased voltage to the inverter 23. The step-up circuit can also reduce the voltage output from the inverter 23 and output the electric power at the reduced voltage to the assemble battery 10.

A charger 27 is connected to the positive electrode line PL and the negative electrode line NL through charge lines CL1 and CL2, respectively. The charge lines CL1 and CL2 are provided with charge relays Rch1 and Rch2, respectively. Each of the charge relays Rch1 and Rch2 is switched between ON and OFF in response to a control signal from the controller 30. The charger 27 is connected to an inlet (so-called connector) 28. The inlet 28 is connected to a plug (so-called connector) provided outside the vehicle.

The plug is connected to an external power source. The plug is connected to the inlet 28 to allow supply of electric power from the external power source to the assembled battery 10 through the charger 27. The assembled battery 10 can be charged by the external power source in this manner. The charge of the assembled battery 10 by the external power source is referred to as external charge. The external power source is a power source provided outside the vehicle, and is a commercial power source, for example.

When the external power source supplies an AC power, the charger 27 converts the AC power from the external power source into a DC power and supplies the DC power to the assembled battery 10. The charger 27 can also perform voltage conversion in performing the external charge. Although the charger 27 is mounted on the vehicle in the present embodiment, the charger may be installed outside the vehicle. A wired or wireless path can be used for supplying the electric power from the external power source to the assembled battery 10. An example of the wireless path is a noncontact charge system with the aid of electromagnetic induction or resonance. The noncontact charge system can has a known configuration as appropriate.

In the present embodiment, the external charge can be performed by turning on the system main relays SMR-B and SMR-G, and the charge relays Rch1 and Rch2. The charge lines CL1 and CL2 may be connected directly to the positive electrode terminal and the negative electrode terminal of the assembled battery 10, respectively. In this case, the external charge requires only turn-on of the charge relays Rch1 and Rch2. The charge lines CL1 and CL2 may share portions with the lines PL and NL, respectively.

An SOC recovery switch 29 is operated by a user (for example, an operator) and is used to increase the State of Charge (SOC) of the assembled battery 10. The user refers to a person who operates the SOC recovery switch 29. The SOC refers to the proportion of the present charge capacity to the full charge capacity. An operation signal (ON/OFF) of the SOC recovery switch 29 is input to the controller 30.

When the SOC recovery switch 29 is switched from OFF to ON through the operation by the user, the controller 30 causes the motor generator MG1 to perform electric power generation. The motor generator MG1 converts a kinetic energy output from the engine 26 into an electric energy, and the electric energy generated by the motor generator MG1 is supplied to the assembled battery 10 through the inverter 23.

The SOC recovery switch 29 can be turned on to forcedly charge the assembled battery 10 as described above. In the present embodiment, the charge of the assembled battery 10 associated with the turn-on of the SOC recovery switch 29 is referred to as forced charge. The forced charge allows the charge of the assembled battery 10 at a constant current. The forced charge is performed while the battery system shown in FIG. 1 is in Ready-On state. For example, the forced charge can be performed during stop or running of the vehicle.

Although the SOC recovery switch 29 is mounted on the vehicle in the present embodiment, the present invention is not limited thereto. Specifically, the forced charge of the assembled battery 10 may be requested from outside the vehicle. For example, the user can operate a terminal (such as a mobile terminal) provided independently of the vehicle to input a signal for requesting the forced charge to the controller 30. In this case, the vehicle can have a receiver mounted thereon for receiving the signal from the terminal. The signal for requesting the forced charge can be transmitted to the controller 30 in a wired or wireless manner.

The vehicle of the present embodiment can perform Electric Vehicle (EV) running and Hybrid Vehicle (HV) running. The EV running refers to running of the vehicle using only the output from the assembled battery 10. The HV running refers to running of the vehicle using a combination of the assembled battery 10 and the engine 26.

Figure 2:
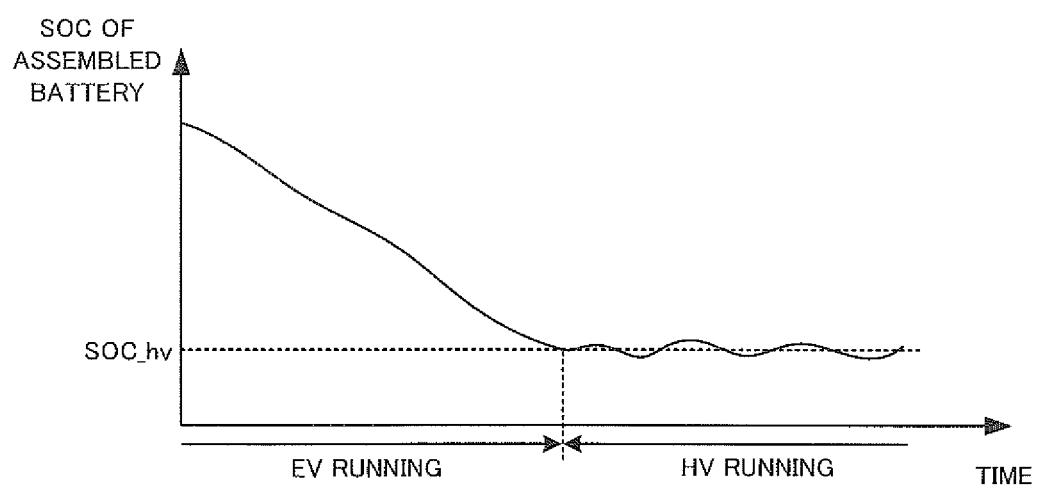
FIG. 2 is a graph for explaining running modes of a vehicle.

Specifically, as shown in FIG. 2, the EV running can be performed until the SOC of the assembled battery 10 is reduced to a predetermined value SOC_hv. In FIG. 2, the vertical axis represents the SOC of the assembled battery 10 and the horizontal axis represents time. Since the vehicle is run using only the output from the assembled battery 10 in the EV running, the SOC of the assembled battery 10 continues to be reduced.

When the SOC of the assembled battery 10 reaches the predetermined value SOC_hv, the vehicle can switch from the EV running to the HV running. In the HV running, charge and discharge of the assembled battery 10 are controlled such that the SOC of the assembled battery 10 is changed along the predetermined value SOC_hv. The predetermined value SOC_hv can be set as appropriate. As the predetermined value SOC_hv is lower, the vehicle can be run over a longer distance in the EV running.

When the SOC of the assembled battery 10 drops below the predetermined value SOC_hv in the HV running, the discharge of the assembled battery 10 is limited, and the charge of the assembled battery 10 can be preferentially performed. The assembled battery 10 can be charged with the motive power of the engine 26. When the SOC of the assembled battery 10 rises above the predetermined value SOC_hv, the charge of the assembled battery 10 is limited, and the discharge of the assembled battery 10 can be preferentially performed. This allows the SOC of the assembled battery 10 to be changed along the predetermined value SOC_hv.

In the battery system of the present embodiment, the full charge capacity of the assembled battery 10 can be calculated in performing the external charge of the assembled battery 10. Specifically, the SOC of the assembled battery 10 at the start of the external charge and the SOC of the assembled battery 10 at the end of the external charge are calculated first. Since the assembled battery 10 is in a non-energized state at the start and the end of the external charge, the Open Circuit Voltage (OCV) of the assembled battery 10 can be measured.

The SOC and the OCV have a predetermined correspondence. Once the correspondence is determined, the OCV is measured and then the SOC corresponding to the measured OCV can be specified. This achieves the calculation of the SOCs of the assembled battery 10 at the start and the end of the external charge.

In addition, the values of current during the external charge are summed. The full charge capacity of the assembled battery 10 can then be calculated on the basis of the following expression (1):

$$FCC = \frac{\Sigma IB}{(SOC\_s - SOC\_e)} \times 100 \quad (1)$$

In the expression (1), FCC represents the full charge capacity of the assembled battery 10. IB represents the current value in performing the external charge and is provided by using the value detected by the current sensor 22. Since the external charge is performed at a constant current, the current value IB has a constant value. $\Sigma IB$ represents the value obtained by summing the current values IB (current sum amount) during the external charge. SOC_s represents the SOC of the assembled battery 10 at the start of the external charge, and SOC_e represents the SOC of the assembled battery 10 at the end of the external charge.

Since the external charge is performed at the constant current value IB, the accurate calculation of the current sum amount $\Sigma IE$ is facilitated as compared with the case where the current value IB is variable. The higher accuracy in the calculation of the current sum amount $\Sigma IE$ can increase the accuracy in calculating the full charge capacity FCC.

Figure 3:
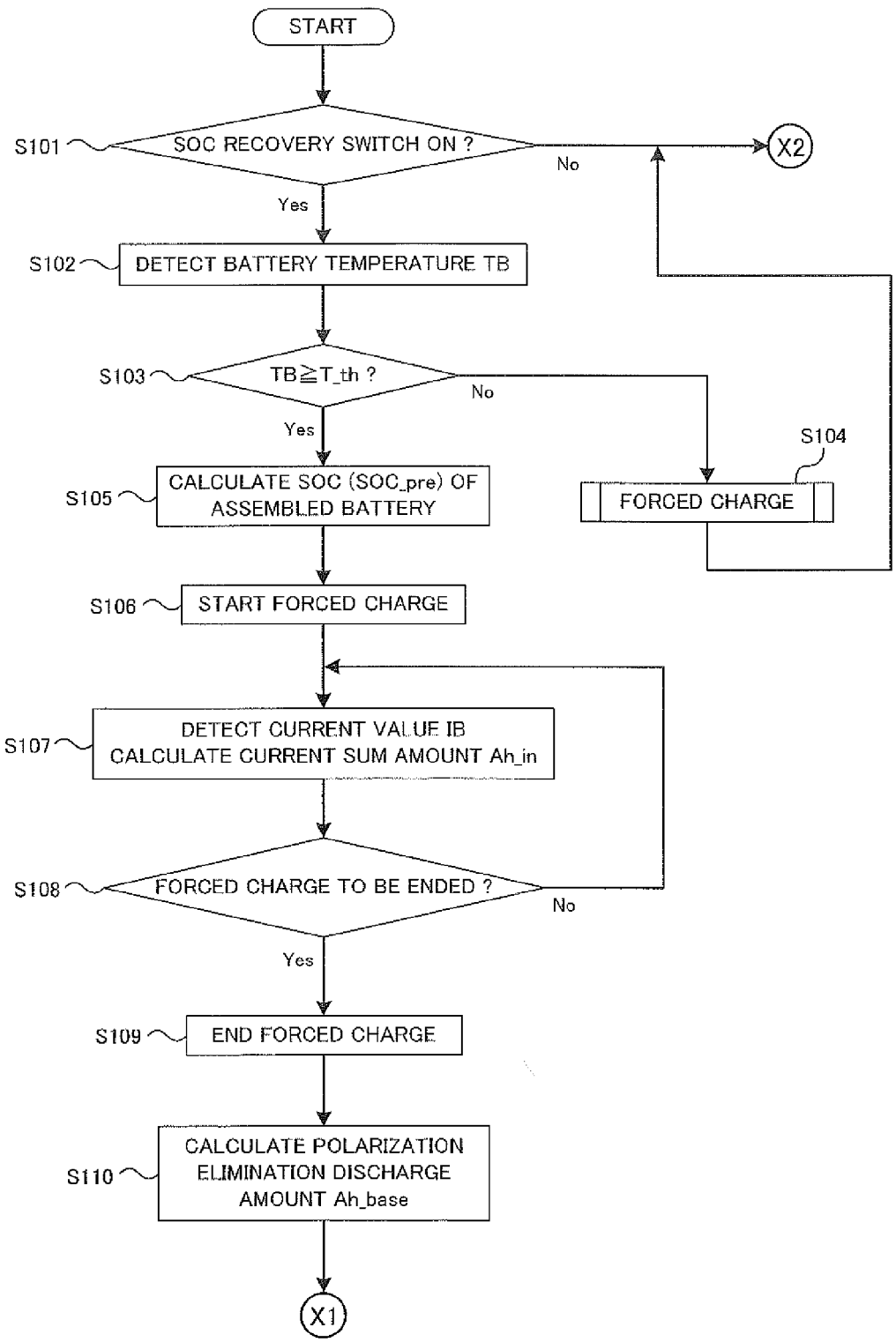
FIG. 3 is a flow chart showing the processing of calculating a full charge capacity.
Figure 4:
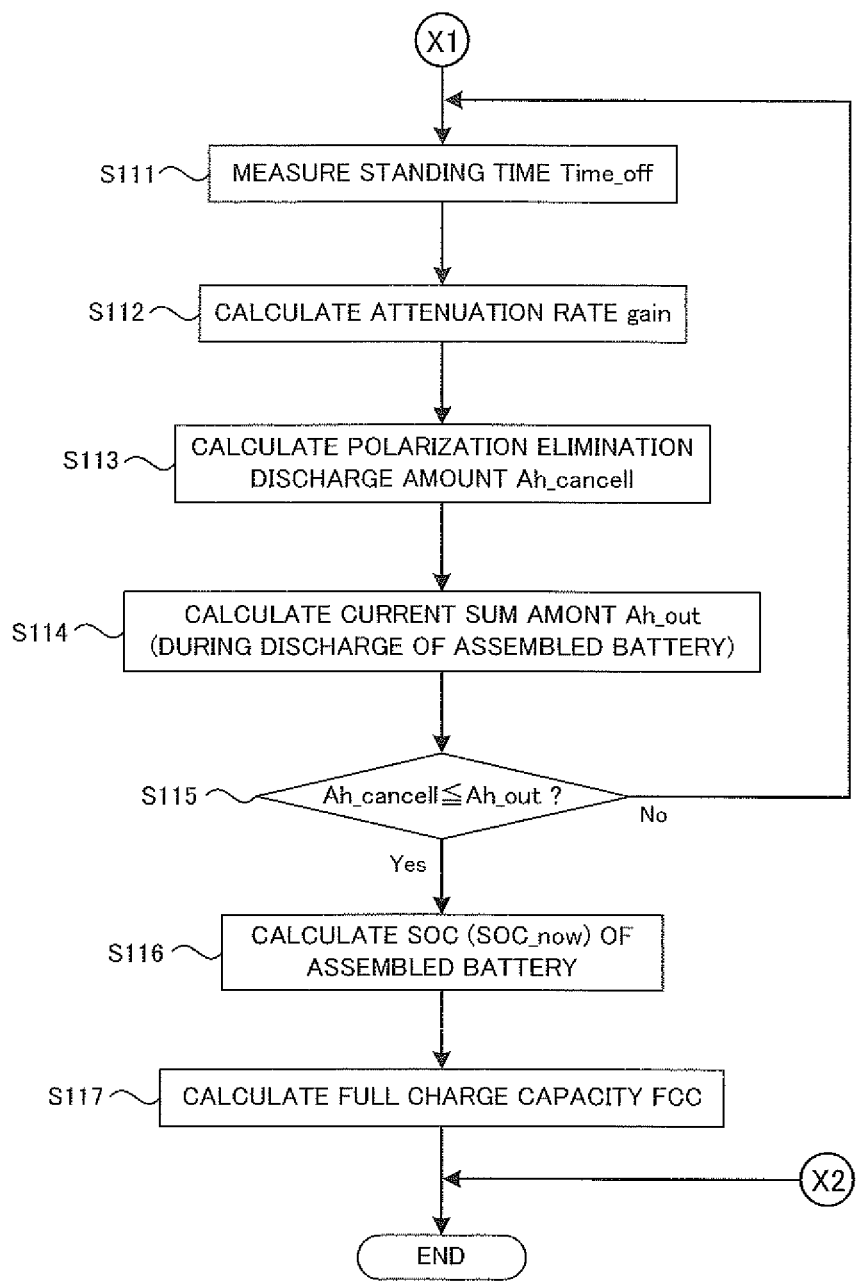
FIG. 4 is a flow chart showing the processing of calculating the full charge capacity.

In the present embodiment, the full charge capacity of the assembled battery 10 is calculated not only when the external charge is performed but also when the forced charge is performed in response to the operation of the SOC recovery switch 29. Description is made of the processing of calculating the full charge capacity of the assembled battery 10 in performing the forced charge with reference to flow charts shown in FIG. 3 and FIG. 4. The processing shown in FIG. 3 and FIG. 4 is performed by the controller 30.

At step S101, the controller 30 determines whether or not the SOC recovery switch 29 is ON. When the SOC recovery switch 29 is ON, the controller 30 performs processing at step S102. When the SOC recovery switch 29 is OFF, the controller 30 ends the processing shown in FIG. 3 and FIG. 4.

At step S102, the controller 30 detects the temperature TB of the assembled battery 10 based on the output from the temperature sensor 21. At step S103, the controller 30 determines whether or not the battery temperature TB detected in the processing at step 102 is equal to or higher than a threshold value T_th.

As described later, the SOC of the assembled battery 10 is calculated before the start of the forced charge. If the battery temperature TB is extremely low, the accuracy in estimating the SOC is reduced. Specifically, if the battery temperature TB is extremely low, the internal resistance of the assembled battery 10 tends to be increased, and thus the estimation accuracy may often be reduced in the estimation of the SOC described later.

To address this, in the present embodiment, it is determined whether or not the battery temperature TB is equal to or higher than the threshold value T_th in order to ensure a certain degree of accuracy in estimating the SOC of the assembled battery 10. The threshold value T_th can be set as appropriate in view of the accuracy in estimating the SOC. Information about the threshold value T_th can be stored in the memory 31. Alternatively, the SOC of the assembled battery 10 may be calculated without determining that the battery temperature TB is equal to or higher than the threshold value T_th. In this case, the processing at steps S102 and S103 is omitted.

When the battery temperature TB is lower than the threshold value T_th, the controller 30 performs processing at step S104. At step S104, the controller 30 performs the forced charge of the assembled battery 10. In the processing at step S104, processing from step S106 to step S109, later described, is performed. After the processing at step S104, the controller 30 ends the processing shown in FIG. 3 and FIG. 4.

When the battery temperature TB is equal to or higher than the threshold value T_th, the controller 30 performs processing at step S105. At step S105, the controller 30 calculates the SOC of the assembled battery 10 (SOC_pre). As described above, through the use of the correspondence between the SOC and the OCV, the SOC of the assembled battery 10 can be calculated by specifying the OCV of the assembled battery 10. The OCV have a relationship shown in the following expression (2):

$$CCV = OCV - IB \times RB \quad (2)$$

In the expression (2), CCV (Closed Circuit Voltage) represents a voltage value detected by the monitor unit 20 in an energized state of the assembled battery 10. IB represents the value of current flowing through the assembled battery 10, and RB represents the internal resistance of the assembled battery 10. The expression (2) can be used to determine the OCV of the assembled battery 10.

The calculation of the SOC of the assembled battery 10 (SOC_pre) can be performed with a known method as appropriate. For example, all the current values IB detected when the assembled battery 10 is charged and discharged can be summed to calculate the SOC of the assembled battery 10.

Once the OCV of the assembled battery 10 is measured in the non-energized state of the assembled battery 10, the SOC of the assembled battery 10 at that point can be calculated. After the calculation of the SOC, current values IB detected during the charge and discharge of the assembled battery 10 are summed. Then, a change amount of SOC, $\Delta$SOC, can be calculated on the basis of the current sum amount and the full charge capacity of the assembled battery 10. The change amount $\Delta$SOC can be added to the SOC calculated from the OCV to calculate the SOC of the assembled battery 10 at the present time.

The full charge capacity of the assembled battery 10 can be provided by using the full charge capacity calculated in performing the external charge or the full charge capacity calculated in performing the forced charge. When the full charge capacity is calculated a plurality of times, the most recently calculated full charge capacity is preferably used. Since the full charge capacity of the assembled battery 10 may be reduced with deterioration of the assembled battery 10, the use of the most recently calculated full charge capacity allows the calculation of the SOC of the assembled battery 10 based on the present deterioration state of the assembled battery 10.

At step S106, the controller 30 starts the forced charge of the assembled battery 10. Specifically, the controller 30 causes the motor generator MG1 to perform electric power generation to charge the assembled battery 10. This increases the SOC of the assembled battery 10.

At step S107, the controller 30 detects the current value IB during the forced charge based on the output from the current sensor 22. Each time the controller 30 detects the current value IB, the controller 30 adds the current value IB to calculate a current sum amount Ah_in.

At step S108, the controller 30 determines whether or not the forced charge should be ended. In performing the forced charge, an increase amount of the SOC through the forced charge can be preset, or an SOC level to be reached at the end of the forced charge can be preset. The controller 30 can determine whether or not the forced charge should be ended on the basis of the preset information.

For example, when the increase amount of the SOC through the forced charge is preset, it can be determined whether or not the forced charge should be ended on the basis of the current sum amount Ah_in calculated in the processing at step S107. Once the full charge capacity of the assembled battery 10 and the current sum amount Ah_in are obtained, the SOC change amount $\Delta$SOC can be calculated. When the change amount $\Delta$SOC reaches the set value, the forced charge can be ended.

Since the SOC of the assembled battery 10 (SOC_pre) at the start of the forced charge is calculated in the processing at step S105, the SOC of the assembled battery 10 at the present time can be obtained by calculating the change amount $\Delta$SOC as described above. When the SOC level to be reached at the end of the forced charge is preset, the forced charge can be ended once the present SOC reaches the set value. For example, an SOC in the full charge state of the assembled battery 10 (SOC=100%) can be set as the SOC (set value) to be reached at the end of the forced charge.

When it is determined that the forced charge should not be ended in the processing at step S108, the controller 30 proceeds to perform the processing at step S107. When the forced charge should be ended, the controller 30 performs processing at step S109. At step S109, the controller 30 ends the forced charge. Specifically, the controller 30 stops the electric power generation by the motor generator MG1 to end the charge of the assembled battery 10.

At step S110, the controller 30 calculates a polarization elimination discharge amount Ah_base. The polarization elimination discharge amount Ah_base represents a discharge amount for eliminating the polarization of the assembled battery 10 resulting from the forced charge. The forced charge causes the polarization of the assembled battery 10 (charge-side polarization). Since the polarization occur due to the charge, discharge of the assembled battery 10 can eliminate the polarization associated with the charge. In the processing at step S110, the discharge amount in the assembled battery 10 for eliminating the polarization due to the charge (polarization elimination discharge amount Ah_base) is calculated.

Figure 5:
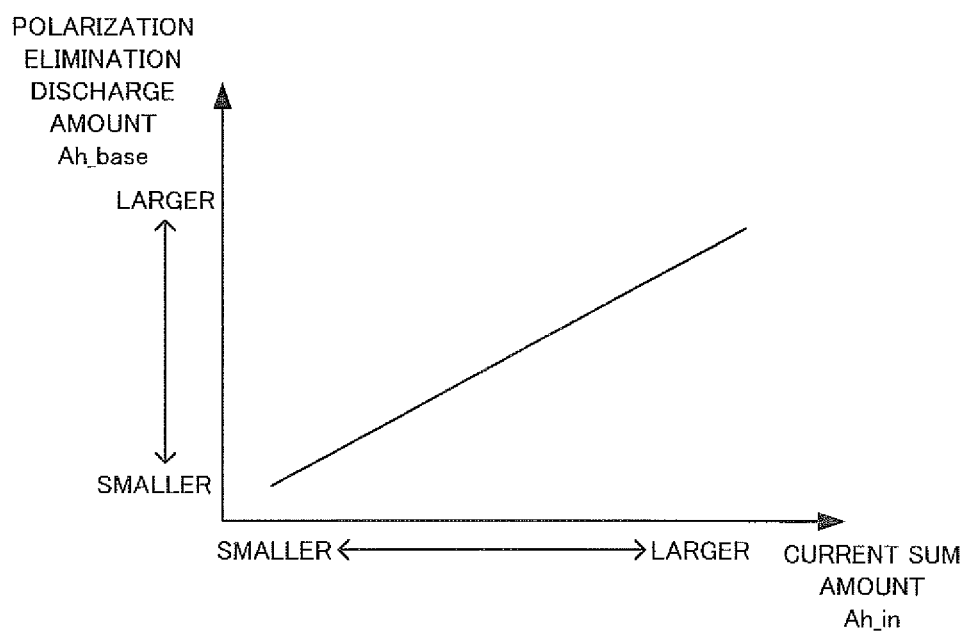
FIG. 5 is a graph showing the relationship between a polarization elimination discharge amount and a current sum amount (during forced charge).

The polarization elimination discharge amount Ah_base varies with the state of the forced charge. Thus, the polarization elimination discharge amount Ah_base can be calculated on the basis of the current sum amount Ah_in calculated in the processing at step S107. For example, as shown in FIG. 5, the correspondence between the polarization elimination discharge amount Ah_base and the current sum amount Ah_in can be previously determined by experiment or the like. Information shown in FIG. 5 can be stored in the memory 31.

Through the use of the correspondence shown in FIG. 5, the current sum amount Ah_in calculated in the processing at step S107 can be used to determine the corresponding polarization elimination discharge amount Ah_base. As shown in FIG. 5, as the current sum amount Ah_in is larger, the polarization elimination discharge amount Ah_base is larger. In other words, as the current sum amount Ah_in is smaller, the polarization elimination discharge amount Ah_base is smaller.

At step S111, the controller 30 measures a standing time Time_off with the timer 32. The standing time Time_off is a time period (accumulated time) for which the assembled battery 10 is left standing without charge and discharge. When the vehicle is stationary after the end of the forced charge, the assemble battery 10 may not be charged and discharged. In this case, the standing time Time_off is measured in the processing at step S111. When the assembled battery 10 is left standing a plurality of times, those standing times are summed and the sum is used as the standing time Time_off.

At step S112, the controller 30 calculates an attenuation rate "gain". The attenuation rate "gain" is a rate at which the polarization elimination discharge amount Ah_base is reduced. The polarization due to the forced charge can also be eliminated by leaving the assembled battery 10 standing without charge and discharge. Since the polarization is gradually reduced when the assembled battery 10 is left standing without charge and discharge, the discharge amount for eliminating the polarization can be reduced.

Figure 6:
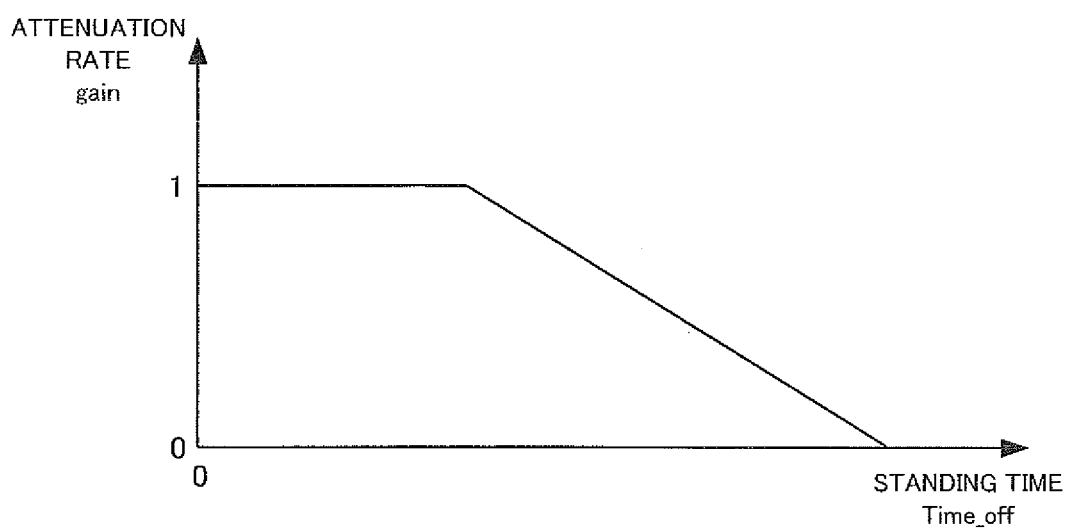
FIG. 6 is a graph showing the relationship between a standing time and an attenuation rate.

Thus, the attenuation rate "gain" is calculated in the processing at step S112. The attenuation rate "gain" depends on the standing time Time_off. As shown in FIG. 6, the correspondence between the attenuation rate "gain" and the standing time Time_off can be previously determined by experiment or the like. Information about the correspondence shown in FIG. 6 can be stored in the memory 31.

Through the use of the (exemplary) correspondence shown in FIG. 6, the standing time Time_off measured in the processing at step S111 can be used to determine the corresponding attenuation rate "gain". As the standing time Time_off is longer, the polarization due to the forced charge is eliminated more easily, so that the discharge amount for eliminating the polarization can be reduced. As shown in FIG. 6, the attenuation rate "gain" can be reduced as the standing time Time_off is increased.

As shown in FIG. 6, when the standing time Time_off is "zero," the attenuation rate "gain" is set at "one" since the elimination of polarization achieved by leaving the assembled battery 10 standing does not occur. In the example shown in FIG. 6, the attenuation rate "gain" is set at "one" until the standing time Time_off reaches a predetermined time. Alternatively, the attenuation rate "gain" may be reduced below "one" when the standing time Time_off becomes longer than "zero."

When the standing time Time_off is sufficiently long, the polarization due to the forced charge can be eliminated. In this case, no discharge of the assembled battery 10 is required in order to eliminate the polarization due to the forced charge, so that the attenuation rate "gain" is set at "zero."

At step S113, the controller 30 calculates a polarization elimination discharge amount Ah_cancell. The polarization elimination discharge amount Ah_cancell is a discharge amount for eliminating the polarization due to the forced charge, similarly to the polarization elimination discharge amount Ah_base. The polarization elimination discharge amount Ah_cancell is the discharge amount determined by factoring in the polarization elimination attributed to the assembled battery 10 left standing.

The polarization elimination discharge amount Ah_cancell can be calculated on the basis of the following expression (3):

$$Ah\_cancell = Ah\_base \times gain \quad (3)$$

In the expression (3), Ah_base represents the polarization elimination discharge amount calculated in the processing at step S110, and "gain" represents the attenuation rate calculated in the processing at step S112. As shown by the expression (3), the polarization elimination discharge amount Ah_base can be multiplied by the attenuation rate "gain" to calculate the polarization elimination discharge amount Ah_cancell factoring in the polarization elimination attributed to the battery left standing. As described above, the polarization elimination discharge amount Ah_cancell is smaller as the attenuation rate "gain" is smaller.

Although the attenuation rate "gain" is calculated in the present embodiment, the present invention is not limited thereto. Specifically, a decrease in discharge amount can be calculated in accordance with the standing time Time_off. Once the decrease in discharge amount is calculated, that decrease can be subtracted from the polarization elimination discharge amount Ah_base to calculate the polarization elimination discharge amount Ah_cancell.

At step S114, the controller 30 calculates a current sum amount Ah_out while the assembled battery 10 is discharged. Specifically, the controller 30 detects the current value IB based on the output from the current sensor 22, and sums the current values IB during the discharge of the assembled battery 10 to calculate the current sum amount Ah_out.

The current sum amount Ah_out can be calculated by summing only the current values IB during the discharge of the assembled battery 10. In other words, the summation of the current values IB can be omitted while the assembled battery 10 is charged with regenerative electric power. Alternatively, the current sum amount Ah_out may be calculated by using not only the current values IB during the discharge but also the current values IB during charge.

As described above, the current value IB has a positive value during discharge, and the current value IB has a negative value during charge. When the current values IB during the charge and discharge are summed, the current sum amount Ah_out is increased or reduced depending on the charge or discharge of the assembled battery 10.

At step S115, the controller 30 determines whether or not the current sum amount Ah_out calculated in the processing at step S114 is equal to or higher than the polarization elimination discharge amount Ah_cancell calculated in the processing at step S113. When the current sum amount Ah_out is equal to or higher than the polarization elimination discharge amount Ah_cancell, the controller 30 determines that the polarization due to the forced charge is eliminated by the discharge of the assembled battery 10 and proceeds to processing at step S116.

When the current sum amount Ah_out is lower than the polarization elimination discharge amount Ah_cancell, the controller 30 determines that the polarization due to the forced charge is not eliminated and returns to the processing at step S111. In this case, the processing from step S111 to step S115 is repeated until the current sum amount Ah_out reaches the polarization elimination discharge amount Ah_cancell.

At step S116, the controller 30 calculates an SOC of the assembled battery 10 (SOC_now). The SOC of the assembled battery 10 can be calculated with a known method as appropriate. SOC_now represents the SOC of the assembled battery 10 immediately after the end of the forced charge. In the processing at step 116, since the assembled battery 10 is discharged after the end of the forced charge, the SOC calculated in the processing at step S116 is not the SOC immediately after the end of the forced charge in terms of time.

When the controller 30 proceeds from the processing at step S115 to the processing at step S116, the polarization due to the forced charge is eliminated. The SOC calculated in the processing at step S116 is the SOC of the assembled battery 10 after the polarization due to the forced charge is eliminated.

The polarization due to the forced charge is present immediately after the end of the forced charge. If the SOC of the assembled battery is estimated with the polarization present, the accuracy in estimating the SOC is reduced. For example, when a voltage value of the assembled battery 10 is used to estimate the SOC of the assembled battery 10, the voltage value includes an amount of voltage change due to the polarization. In this case, the estimation of the SOC has an error corresponding to the amount of voltage change due to the polarization.

In the present embodiment, after ensuring that the polarization due to the forced charge is eliminated as described above, the SOC of the assembled battery 10 immediately after the elimination of the polarization is used as the SOC of the assembled battery 10 immediately after the end of the forced charge. This allows the estimation of the SOC of the assembled battery 10 immediately after the end of the forced charge without including the amount of voltage change due to the polarization, thereby improving the accuracy in estimating the SOC.

At step S117, the controller 30 calculates the full charge capacity FCC of the assembled battery 10. The full charge capacity FCC can be calculated on the basis of the following expression (4):

$$FCC = \frac{Ah\_in - Ah\_out}{SOC\_now - SOC\_pre} \times 100 \tag{4}$$

In the expression (4), Ah_in represents the current sum amount during the forced charge and is provided by using the value calculated in the processing at step S107. Ah_out represents the current sum amount detected until the polarization due to the forced charge is eliminated during the discharge of the assembled battery 10 after the end of the forced charge.

When only the discharge of the assembled battery 10 is performed after the end of the forced charge, the current sum amount Ah_out shown in the expression (4) is the value provided by summing the current values IB during the discharge. When the charge and discharge of the assembled battery 10 are performed after the end of the forced charge, the current sum amount Ah_out shown in the expression (4) is the value provided by summing the current values IB during the charge and the current values IB during the discharge. In this case, the current sum amount Ah_out is increased or reduced depending on the charge or discharge of the assembled battery 10.

SOC_now shown in the expression (4) represents the SOC of the assembled battery 10 immediately after the end of the forced charge and is provided by using the value calculated in the processing at step S116. The SOC_pre represents the SOC of the assembled battery 10 at the start of the forced charge and is provided by using the value calculated in the processing at step S105.

As shown in the expression (4), the calculation of the full charge capacity FCC factors in not only the current sum amount Ah_in during the forced charge but also the current sum amount Ah_out found during the discharge after the forced charge. Since SOC_now is the SOC calculated after the discharge of the assembled battery 10, the calculation of the full charge capacity FCC from the difference between SOC_now and SOC_pre needs to factor in not only the current sum amount Ah_in during the forced charge but also the current sum amount Ah_out during the discharge.

In calculating the full charge capacity FCC based on the expression (4), the difference ΔSOC between SOC_pre and SOC_now is preferably increased. As the difference ΔSOC is reduced, the current sum amount Ah_in is reduced. The current sum amount Ah_in is calculated by summing the current values IB detected by the current sensor 22, and the current value IB includes a detection error from the current sensor 22.

When the current sum amount Ah_in is reduced, the detection error from the current sensor 22 has an increased proportion in the current sum amount Ah_in to reduce the accuracy in calculating the current sum amount Ah_in. When the current sum amount Ah_in is increased, the detection error from the current sensor 22 can have a reduced proportion in the current sum amount Ah_in to increase the accuracy in calculating the current sum amount Ah_in.

The increased accuracy in calculating the current sum amount Ah_in can improve the accuracy in calculating the full charge capacity FCC based on the expression (4). For increasing the SOC of the assembled battery 10 through the forced charge, the increase amount of the SOC (the current sum amount Ah_in during the forced charge) can be set as appropriate by taking account of the accuracy in calculating the current sum amount Ah_in.

Although the full charge capacity FCC is calculated based on the SOC of the assembled battery 10 (SOC_now) after the discharge of the assembled battery 10 by the polarization elimination discharge amount Ah_cancell, the present invention is not limited thereto. Specifically, the full charge capacity FCC can be calculated based on the SOC of the assembled battery 10 immediately after the end of the forced charge.

In this case, the expression (1) can be used to calculate the full charge capacity FCC. In the expression (1), the SOC of the assembled battery 10 at the start of the forced charge can be used as SOC_s, and the SOC of the assembled battery 10 immediately after the end of the forced charge can be used as SOC_e. The current sum amount during the forced charge can be used as SIB.

In the present embodiment, the full charge capacity FCC of the assembled battery 10 can also be calculated in performing the forced charge. Specifically, the full charge capacity FCC can be calculated not only in performing the external charge but also in performing the forced charge, thereby increasing the opportunities of calculating the full charge capacity FCC.

Since the full charge capacity FCC of the assembled battery 10 is reduced with deterioration of the assembled battery 10, it is necessary to obtain the full charge capacity FCC of the assembled battery 10 at the present time. If the full charge capacity FCC is not accurately found, the subsequent estimation of the SOC of the assembled battery 10 based on the full charge capacity FCC is performed with low accuracy.

For calculating a cruising distance of the vehicle based on the full charge capacity FCC, it is necessary to accurately know the full charge capacity FCC in order to ensure a certain degree of accuracy in calculating the cruising distance. The cruising distance refers to a distance over which the vehicle can be run in the EV running. Since the full charge capacity FCC of the assembled battery 10 is reduced with deterioration of the assembled battery 10, it is necessary to keep track of the full charge capacity FCC for the calculation of the cruising distance. If the full charge capacity FCC is not accurately known, the cruising distance incorporating the present full charge capacity FCC cannot be calculated, and thus the accuracy in calculating the cruising distance is reduced.

If the full charge capacity FCC is calculated only in performing the external charge, the full charge capacity FCC is not calculated unless the external charge is performed. As a result, the full charge capacity FCC in the present assembled battery 10 is obtained on limited occasions. In contrast, the full charge capacity FCC can also be calculated in performing the forced charge as in the present embodiment to increase the opportunities of calculating the full charge capacity FCC. This allows the full charge capacity FCC in the present assembled battery 10 to be obtained on more occasions.

Since the SOC of the assembled battery 10 (SOC_now) is calculated in the state in which the polarization due to the forced charge is eliminated as described above in the present embodiment, the SOC of the assembled battery 10 immediately after the end of the forced charge can be estimated accurately. Since the full charge capacity FCC is calculated based on the SOC_now with the ensured estimation accuracy, the accuracy in estimating the full charge capacity FCC can also be increased. The increased accuracy in estimating the full charge capacity FCC can improve the accuracy in calculating the cruising distance.

Figure 7:
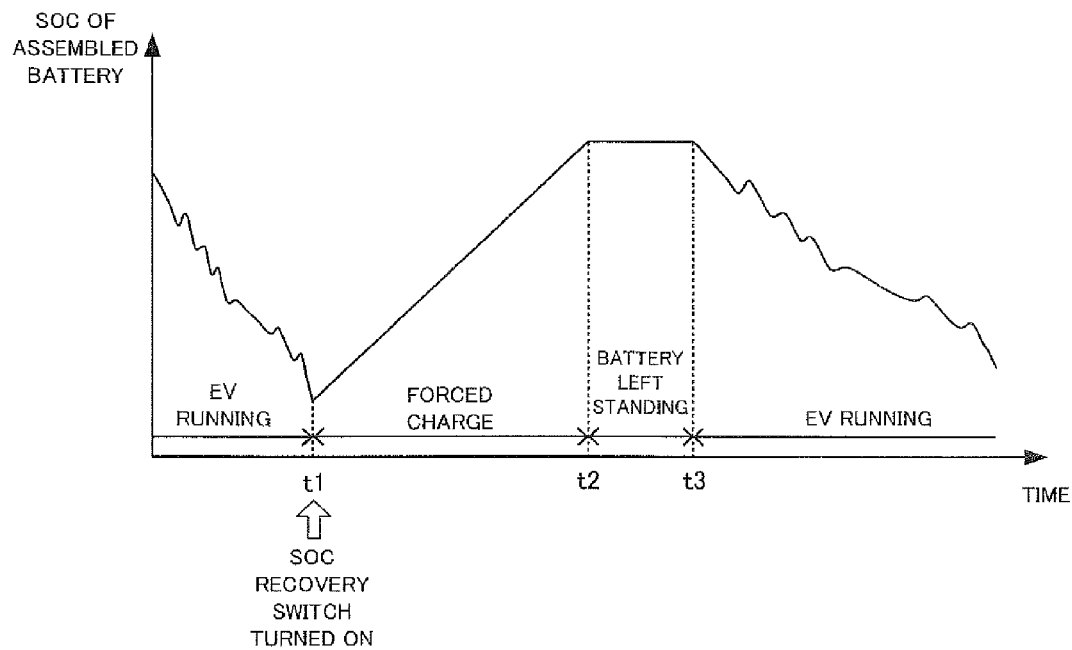
FIG. 7 is a graph showing a change in SOC when the processing shown in FIG. 3

FIG. 7 shows a (exemplary) change in SOC when the processing shown in FIG. 3 and FIG. 4 is performed. In FIG. 7, the vertical axis represents the SOC of the assembled battery 10, and the horizontal axis represents time.

When the SOC recovery switch 29 is operated during the EV running or the HV running, the forced charge is started at a time t1. In the example shown in FIG. 7, the EV running is performed until the time t1. SOC_pre is calculated at the time t1. The forced charge at a constant current is performed to increase the SOC of the assembled battery 10 at a constant change rate. The SOC of the assembled battery 10 continues to be increased, and when it is determined that the forced charge should be ended, the forced charge is ended at a time t2.

The current sum amount Ah_in is calculated in the period between the time t1 and the time t2. The polarization elimination discharge amount Ah_base is calculated at the time t2. As shown in FIG. 7, when the assembled battery 10 is left standing without charge and discharge after the time t2, the standing time Time_off is measured. Since the assembled battery 10 is left standing from the time t2 to a time t3 in the example shown by FIG. 7, the interval from the time t2 to the time t3 corresponds to the standing time Time_off.

At the time t3, the attenuation rate "gain" corresponding to the standing time Time_off is calculated, and the polarization elimination discharge amount Ah_cancell is calculated on the basis of the attenuation rate "gain" and the polarization elimination discharge amount Ah_base. At the time t3, the EV running is started. The SOC of the assembled battery 10 is reduced as the assembled battery 10 is discharged.

After the time t3, the current sum amount Ah_out during the discharge of the assembled battery 10 is calculated, and when the current sum amount Ah_out reaches the polarization elimination discharge amount Ah_cancell, SOC_now is calculated. SOC_now is used as the SOC of the assembled battery 10 immediately after the end of the forced charge (at the time t2). After the calculation of SOC_now, the full charge capacity FCC of the assembled battery 10 is calculated on the basis of the expression (4).

Figure 8:
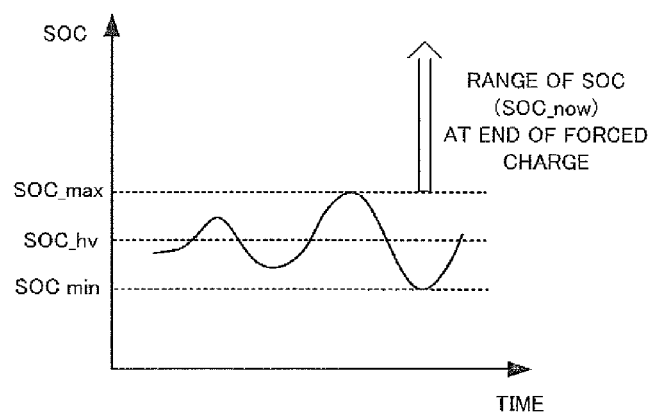
FIG. 8 is a graph showing a range of changing SOCs in HV running and a range of SOCs after the end of the forced charge.

As shown in FIG. 8, the SOC of the assembled battery 10 after the end of the forced charge is set in a range above the upper limit value of the range in which the SOC can vary in the HV running. SOC_hv shown in FIG. 8 corresponds to SOC_hv shown in FIG. 2. In the HV running, SOC_max and SOC_min are set with reference to SOC_hv.

SOC_max is an SOC higher than SOC_hv, and SOC_min is an SOC lower than SOC_hv. When the SOC of the assembled battery 10 reaches SOC_max in the HV running, the charge of the assembled battery 10 is not performed, and the discharge of the assembled battery 10 is preferentially performed. When the SOC of the assembled battery 10 reaches SOC_min, the discharge of the assembled battery 10 is not performed, and the charge of the assembled battery 10 is preferentially performed.

Thus, the SOC of the assembled battery 10 is changed along SOC_hv within the range from SOC_max to SOC_min in the HV running as shown in FIG. 8. The SOC of the assembled battery 10 (SOC_now) at the end of the forced charge is higher than SOC_max. This allows the EV running to be performed preferentially instead of the HV running after the forced charge is performed by the operation of the SOC recovery switch 29. The preferential EV running can extend the time period for which the EV running is performed.

DESCRIPTION OF THE REFERENCE NUMERALS

10: Assembled Battery, 11: Cell, 20: Monitor Unit,
21: Temperature Sensor, 22: Current Sensor, 23: Inverter,
MG1, MG2: Motor Generator, 24: Driving Wheels,
25: Power Splitting Mechanism, 26: Engine, 27: Charger,
28: Inlet,
30: Controller, 31: Memory, 32: Timer, PL: Positive Electrode Line,
NL: Negative Electrode Line, CL1, CL2: Charge Line,
SMR-B, SMR-G, SMR-P: System Main Relay,
R: Current Limiting Resistor, Rch1, Rch2: Charge Relay

The invention claimed is:

1. A vehicle comprising:
an electric storage apparatus configured to output an electric power to be converted into a kinetic energy for use in running of the vehicle;
an engine configured to generate a kinetic energy for use in running of the vehicle;
a generator configured to receive an output from the engine to generate an electric power; and
a controller configured to control charge and discharge of the electric storage apparatus,
wherein, when performing a first charging process and a second charging process, the first charging process being a process in which the electric storage apparatus is charged using an electric power from an external power source and the second charging process being a process in which the electric storage apparatus is charged using the electric power output from the generator in response to a signal produced through operation by an user, the controller calculates a full charge capacity of the electric storage apparatus based on the following expression:

$$FCC = \frac{\sum IB}{(SOC\_s - SOC\_e)} \times 100$$

where FCC represents the full charge capacity of the electric storage apparatus, $\sum IB$ represents a current sum amount during the first or second charging process, SOC_s represents a start SOC of the electric storage apparatus at start of the first or second charging process and SOC_e represents an end SOC of the electric storage apparatus at end of the first or second charging process.

2. The vehicle according to claim 1, wherein the controller is configured to:
calculate the SOC of the electric storage apparatus after polarization of the electric storage apparatus resulting from the second charging process is eliminated; and
use the calculated SOC as the end SOC in the calculation of the full charge capacity of the electric storage apparatus.

3. The vehicle according to claim 2, wherein the controller is configured to:

calculate the SOC of the electric storage apparatus after the electric storage apparatus is discharged to eliminate the polarization; and use the calculated SOC as the end SOC in the calculation of the full charge capacity of the electric storage apparatus.

4. The vehicle according to claim 3, wherein the controller is configured to:

specify a discharge amount for eliminating the polarization based on a current sum amount during the second charging process;

calculate an SOC of the electric storage apparatus after discharge of the electric storage apparatus by the specified discharge amount; and calculate the full charge capacity of the electric storage apparatus based on the following expression:

$$FCC = \frac{Ah\_in - Ah\_out}{SOC\_now - SOC\_pre} \times 100$$

where FCC represents the full charge capacity of the electric storage apparatus, Ah_in represents the current sum amount during the second charging process, Ah_out represents the current sum amount detected between the end of the second charging process and the elimination of the polarization due to the second charging process, SOC_now represents the calculated SOC after discharge of the electric storage apparatus by the specified discharge amount and SOC_pre represents an SOC of the electric storage apparatus at the start of the second charging process.

5. The vehicle according to claim 4, wherein, when the electric storage apparatus is left standing without charge and discharge after the end of the second charging process, the controller is configured to:

measure a standing time period for which the electric storage apparatus is left standing, and multiply the discharge amount by an attenuation rate calculated from the standing time period, the attenuation rate being smaller as the standing time period is longer.

6. The vehicle according to claim 1, wherein the controller is configured to:

control charge and discharge of the electric storage apparatus such that an SOC of the electric storage apparatus is changed within a predetermined range in a mode in which the engine and the electric storage apparatus are used in combination to run the vehicle; and charge the electric storage apparatus to an SOC higher than an upper limit value of the predetermined range in performing the second charging process.

7. The vehicle according to claim 1, further comprising a motor generator configured to receive the electric power output from the electric storage apparatus to generate a kinetic energy for use in running of the vehicle and to convert a kinetic energy generated in braking of the vehicle into an electric power.

8. The vehicle according to claim 1, further comprising a switch configured to output a signal for requesting the second charging process through operation by the user.

9. The vehicle according to claim 1, wherein the controller is configured to charge the electric storage apparatus at a constant current in the second charging process.

* * * * *